US012802521B2

(12) United States Patent
Russ et al.

(10) Patent No.: US 12,802,521 B2
(45) Date of Patent: Nov. 17, 2026

(54) INCORPORATING CRYPTOGRAPHIC TOKEN-BASED GAME FEATURES WITH PHYSICAL PLAYING CARDS

(71) Applicant: IGT, Las Vegas, NV (US)

(72) Inventors: Michael Russ, Graz (AT); Stefan Keilwert, St. Josef (AT); David Froy, Lakeville-Westmorland (CA); Sven Aurich, Schwanberg (AT)

(73) Assignee: IGT, Las Vegas, NV (US)

( * ) Notice: Subject to any disclaimer, the term of this patent is extended or adjusted under 35 U.S.C. 154(b) by 182 days.

(21) Appl. No.: 18/798,456

(22) Filed: Aug. 8, 2024

(65) Prior Publication Data

US 2026/0045141 A1 Feb. 12, 2026

(51) Int. Cl.
*G07F 17/32* (2006.01)

(52) U.S. Cl.
CPC ........ *G07F 17/322* (2013.01); *G07F 17/3211* (2013.01); *G07F 17/3237* (2013.01)

(58) Field of Classification Search
None
See application file for complete search history.

(56) References Cited

U.S. PATENT DOCUMENTS 6,761,634 B1 * 7/2004 Peterson ............... A63F 13/215 463/30
11,830,309 B2 11/2023 Nelson et al.
2006/0116208 A1 * 6/2006 Chen ....................... G06F 9/545 463/43
2006/0128463 A1 * 6/2006 Okada ................. G07F 17/3239 463/29
2020/0082636 A1 * 3/2020 Rudell .................. A63F 13/212
2022/0398569 A1 * 12/2022 Xavier ............. G06Q 10/06398
2023/0222467 A1 * 7/2023 Wang ..................... G06Q 30/06 705/71
2025/0125961 A1 * 4/2025 Chapel ...................... H04L 9/50

* cited by examiner

*Primary Examiner* — Jasson H Yoo
(74) *Attorney, Agent, or Firm* — Spencer Fane LLP; William M. Kelly

(57) ABSTRACT

A system can perform operations to provide and/or maintain a cryptographic token associated with game features. The operations can include determining a value of a physical game element being used by a player as part of a wagering game. The operations can further include determining that a cryptographic token is owned by the player. The operations can further include outputting a game feature based on the value of the physical game element and the cryptographic token.

20 Claims, 7 Drawing Sheets

INCORPORATING CRYPTOGRAPHIC TOKEN-BASED GAME FEATURES WITH PHYSICAL PLAYING CARDS

BACKGROUND

Embodiments described herein relate to use of a cryptographic token (e.g., a non-fungible token ("NFT")) in association with one or more games (e.g., games of chance, games of skill, and/or sporting events). These games can be provided in a gaming environment (e.g., provided by a casino) that includes electronic gaming machines ("EGMs"). EGMs can include one or more games (e.g., wagering games) stored therein that can be played by a player. The EGM can provide a prize to the player based on a wager and an outcome of a wagering game. In some examples, a wagering game includes a slot game in which, in response to receiving a wager from the player, one or more rows of symbols are revealed. A prize can be provided to the player based on the one or more rows of symbols including one or more winning combinations of symbols. In additional or alternative examples, a wagering game includes a table game or a sports book.

SUMMARY

According to some embodiments, a system is provided that includes processing circuitry and memory coupled to processing circuitry. The memory has instructions stored therein that are executable by the processing circuitry to cause the system to perform operations. The operations include determining a value of a physical game element being used by a player as part of a wagering game. The operations further include determining that a cryptographic token is owned by the player. The operations further include outputting a game feature based on the value of the physical game element and the cryptographic token.

According to other embodiments, an electronic gaming machine ("EGM") is provided that includes processing circuitry and memory coupled to processing circuitry. The memory has instructions stored therein that are executable by the processing circuitry to cause the EGM to perform operations. The operations include receiving an indication of a value of a physical game element being used by a player as part of a wagering game provided by the EGM. The operations further include outputting a virtual game element associated with the wagering game based on the value of the physical game element and using a style based on a cryptographic token owned by the player.

According to other embodiments, a method is provided. The method includes determining a value of a physical game element being used by a player as part of a wagering game. The method further includes determining that a cryptographic token is owned by the player. The method further includes outputting a game feature associated with the wagering game based on the value of the physical game element and the cryptographic token.

According to other embodiments, EGMs, systems, methods, and non-transitory computer-readable medium are provided for performing the above embodiments.

DETAILED DESCRIPTION

Developing and maintaining a loyal customer base is one component of operating a successful gaming establishment. To develop a loyal customer base, casinos attempt to generate interactions with their patrons that provide a unique and personalized experience. As an example, gaming establishments offer patrons the opportunity to participate in a player loyalty program via which patrons are offered various promotions that encourage the patron to return to the gaming establishment.

Some card games (e.g., poker) are well-known and include limited variability. For example, poker cards can be relatively basic with default symbols and a default backside. The same style of poker cards can be used by all players and the poker games can involve a default set of rules followed by all players. Although virtual versions of card games can offer slightly more customization, the customization is limited to a set of options provided as part of the virtual game (e.g., a player can select a backside to be displayed from a set of five backsides available to all players).

Various embodiments herein describe a gaming system in which players can play wagering games (including card games) that implement game features based on a cryptographic token being owned by the player. In some embodiments, poker players can have special virtual poker cards become part of a game based on the player owning a cryptographic token that includes an indication for gaming systems to use the virtual poker cards. In some examples, the special virtual poker cards are displayed by the gaming system such that they are visible by all the players. In additional or alternative examples, the special virtual poker cards include animations, outlines, or prominent symbols. This can allow for poker players to have increased enjoyment from playing as well as demonstrate prestige during a poker game.

Figure 1:
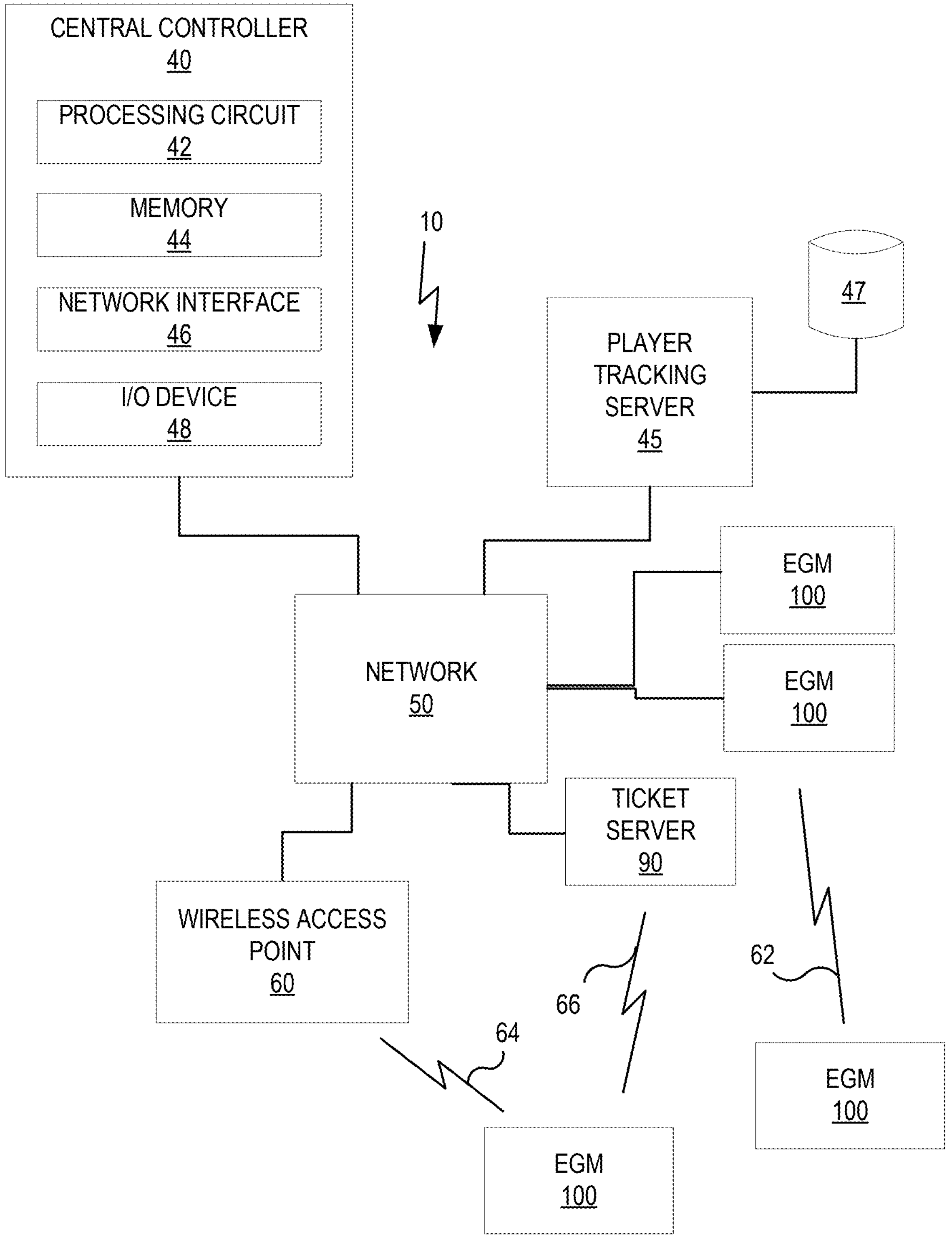
FIG. 1 is a schematic block diagram illustrating an example of a network configuration for a plurality of gaming devices according to some embodiments.

Before describing these and other embodiments in detail, reference is made to FIG. 1, which illustrates a gaming system 10 including a plurality of gaming devices 100. As discussed above, the gaming devices 100 may be one type of a variety of different types of gaming devices, such as electronic gaming machines (EGMs), mobile devices, or other devices, for example. The gaming system 10 may be located, for example, on the premises of a gaming establishment, such as a casino. The gaming devices 100, which are typically situated on a casino floor, may be in communication with each other and/or at least one central controller 40 through a data communication network 50 that may include a remote communication link. The central controller 40 can include processing circuit 42, memory 44, network interface 46, and an input/output ("I/O") device 48. In some examples, the memory 44 includes instructions executable by processing circuit 42 for causing the central controller 40 to perform operations. The operations can include communicating with the data communication network 50 via the network interface 46 and/or communicating with a user/operator via the I/O device 48.

The data communication network 50 may be a private data communication network that is operated, for example, by the gaming facility that operates the gaming devices 100. Communications over the data communication network 50 may be encrypted for security. The central controller 40 may be any suitable server or computing device which includes at least one processor circuit and at least one memory or storage device. Each gaming device 100 may include a processor circuit that transmits and receives events, messages, commands or any other suitable data or signal between the gaming device 100 and the central controller 40. The gaming device processor circuit is operable to execute such communicated events, messages or commands in conjunction with the operation of the gaming device 100. Moreover, the processor circuit of the central controller 40 is configured to transmit and receive events, messages, commands or any other suitable data or signal between the central controller 40 and each of the individual gaming devices 100. In some embodiments, one or more of the functions of the central controller 40 may be performed by one or more gaming device processor circuits. Moreover, in some embodiments, one or more of the functions of one or more gaming device processor circuits as disclosed herein may be performed by the central controller 40.

A wireless access point 60 provides wireless access to the data communication network 50. The wireless access point 60 may be connected to the data communication network 50 as illustrated in FIG. 1, and/or may be connected directly to the central controller 40 or another server connected to the data communication network 50.

A player tracking server 45 may also be connected through the data communication network 50. The player tracking server 45 may manage a player tracking account that tracks the player's gameplay and spending and/or other player preferences and customizations, manages loyalty awards for the player, manages funds deposited or advanced on behalf of the player, and other functions. Player information managed by the player tracking server 45 may be stored in a player information database 47.

As further illustrated in FIG. 1, the gaming system 10 may include a ticket server 90 that is configured to print and/or dispense wagering tickets. The ticket server 90 may be in communication with the central controller 40 through the data communication network 50. Each ticket server 90 may include a processor circuit that transmits and receives events, messages, commands or any other suitable data or signal between the ticket server 90 and the central controller 40. The ticket server 90 processor circuit may be operable to execute such communicated events, messages or commands in conjunction with the operation of the ticket server 90. Moreover, in some embodiments, one or more of the functions of one or more ticket server 90 processor circuits as disclosed herein may be performed by the central controller 40.

The gaming devices 100 communicate with one or more elements of the gaming system 10 to coordinate providing wagering games and other functionality. For example, in some embodiments, the gaming device 100 may communicate directly with the ticket server 90 over a wireless interface 62, which may be a WiFi link, a Bluetooth link, an NFC link, etc. In other embodiments, the gaming device 100 may communicate with the data communication network 50 (and devices connected thereto, including other gaming devices 100) over a wireless interface 64 with the wireless access point 60. The wireless interface 64 may include a WiFi link, a Bluetooth link, an NFC link, etc. In still further embodiments, the gaming devices 100 may communicate simultaneously with both the ticket server 90 over the wireless interface 66 and the wireless access point 60 over the wireless interface 64. Some embodiments provide that gaming devices 100 may communicate with other gaming devices over a wireless interface 64. In these embodiments, wireless interface 62, wireless interface 64 and wireless interface 66 may use different communication protocols and/or different communication resources, such as different frequencies, time slots, spreading codes, etc.

Figure 2A:
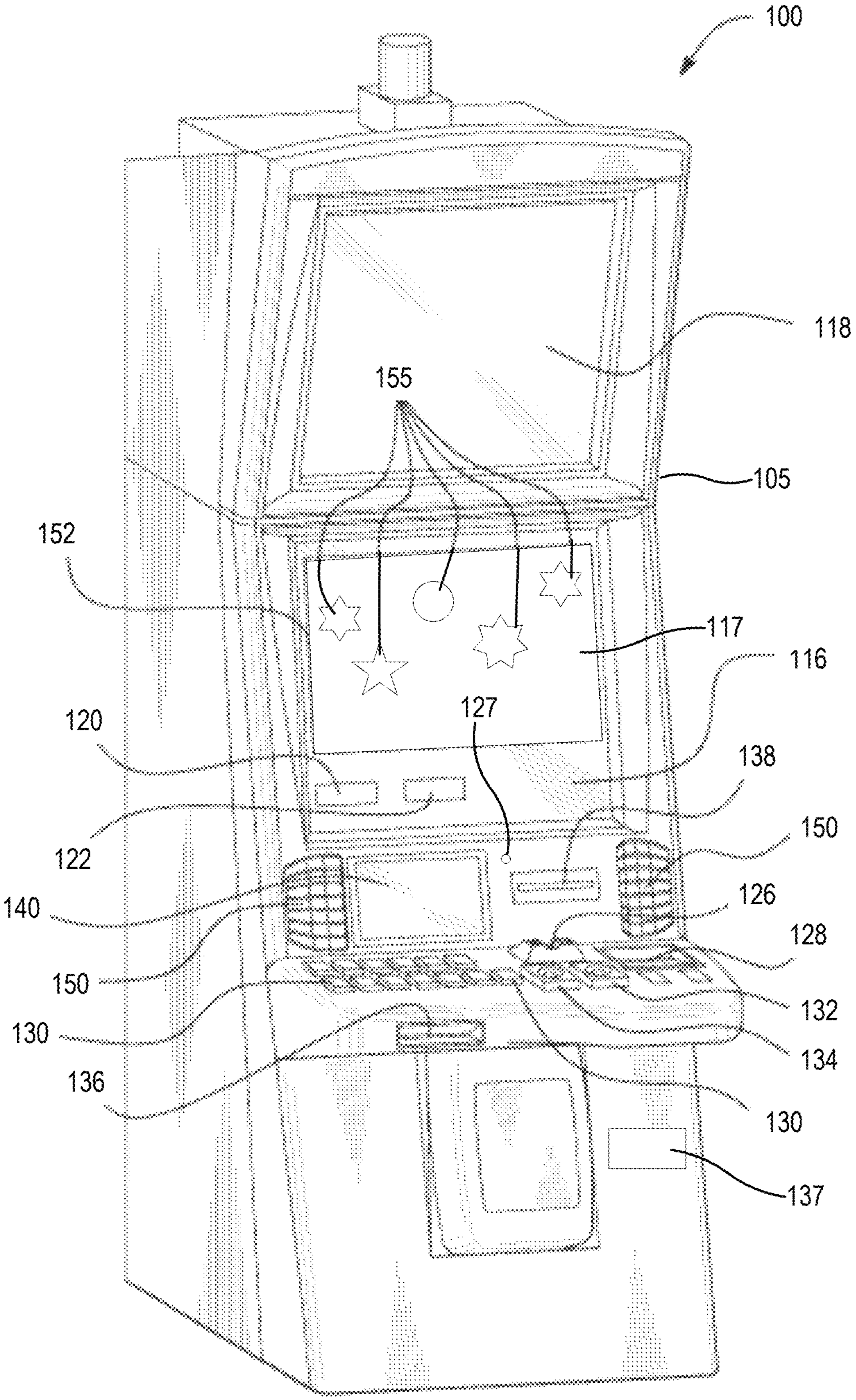
FIGS. 2A-E are diagrams illustrating examples of gaming devices according to some embodiments.
Figure 2B:
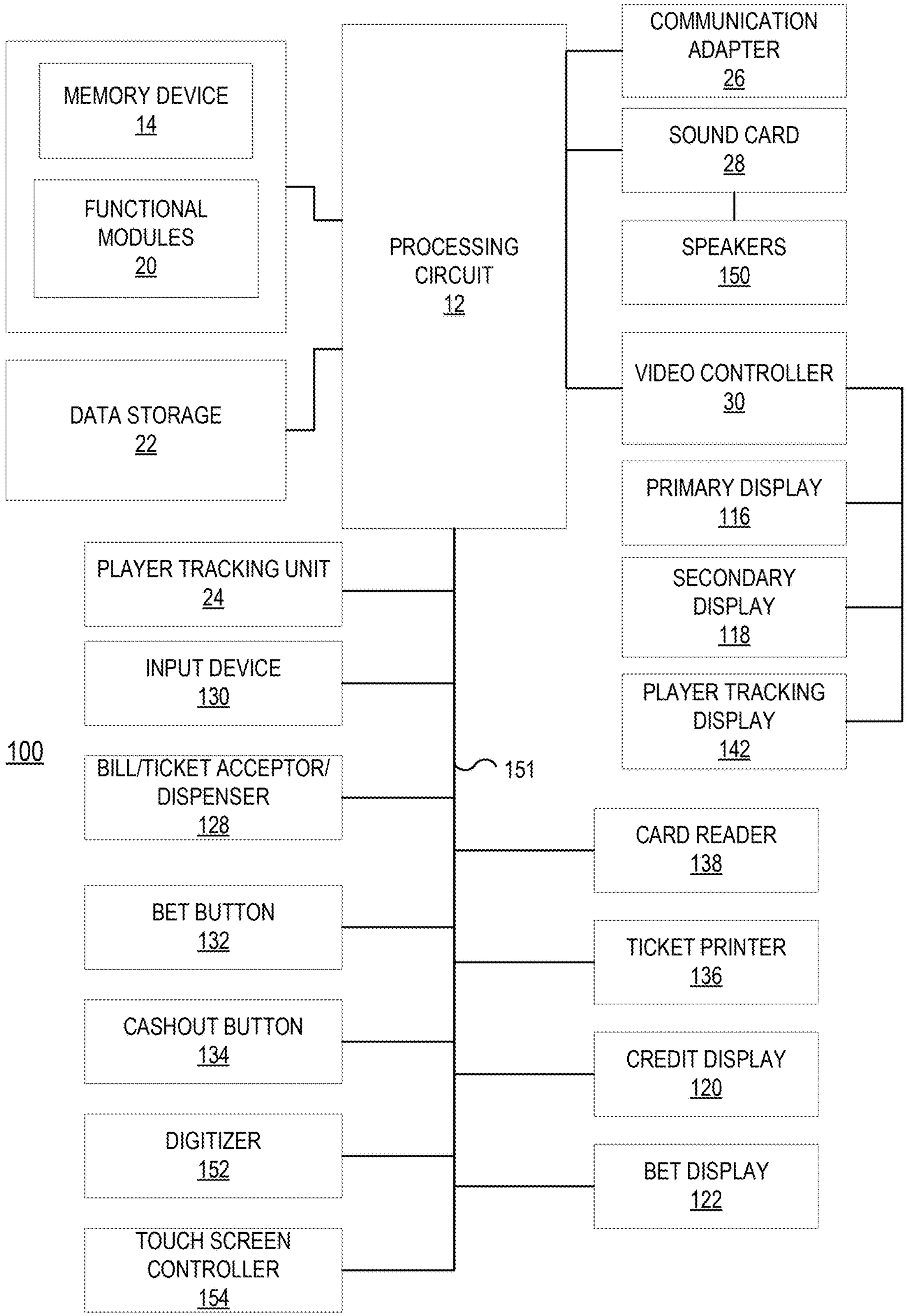
Figure 2C:
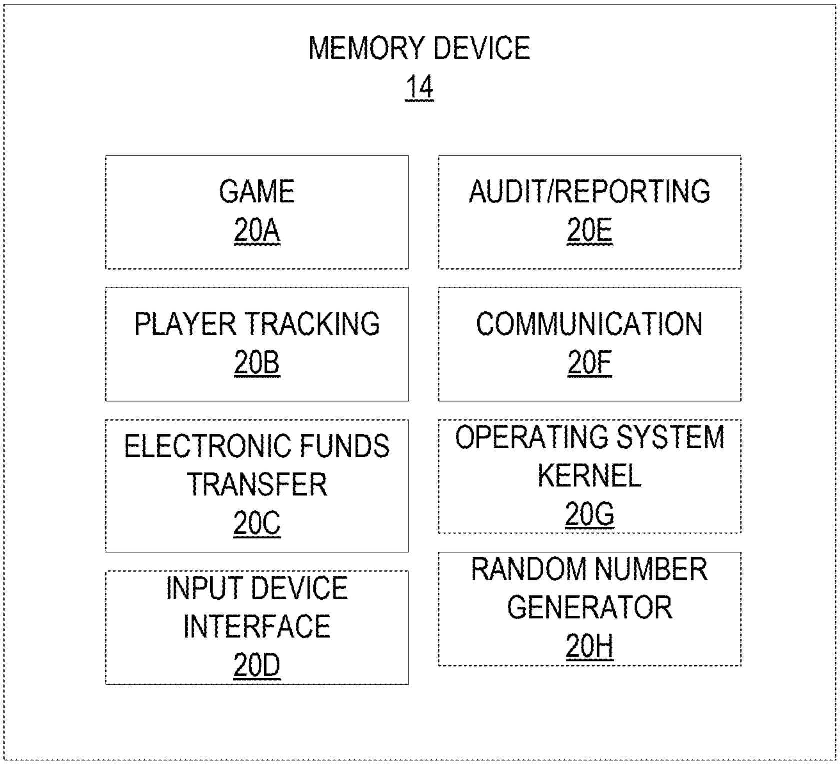

Embodiments herein may include different types of gaming devices. Various embodiments are illustrated in FIGS. 2A-2C in which FIG. 2A is a perspective view of a gaming device 100 illustrating various physical features of the device, FIG. 2B is a functional block diagram that schematically illustrates an electronic relationship of various elements of the gaming device 100, and FIG. 2C illustrates various functional modules that can be stored in a memory device of the gaming device 100. The embodiments shown in FIGS. 2A-C are provided as examples for illustrative purposes only. It will be appreciated that gaming devices may come in many different shapes, sizes, layouts, form factors, and configurations, and with varying numbers and types of input and output devices, and that embodiments of the inventive concepts are not limited to the particular gaming device structures described herein.

Gaming devices 100 typically include a number of standard features, many of which are illustrated in FIGS. 2A-B. For example, referring to FIG. 2A, a gaming device 100 may include a support structure, housing 105 (e.g., cabinet) which provides support for a plurality of displays, inputs, outputs, controls and other features that enable a player to interact with the gaming device 100.

The gaming device 100 illustrated in FIG. 2A includes a number of display devices, including a primary display device 116 located in a central portion of the housing 105 and a secondary display device 118 located in an upper portion of the housing 105. A plurality of game components 155 are displayed on a display screen 117 of the primary display device 116. It will be appreciated that one or more of the display devices 116, 118 may be omitted, or that the display devices 116, 118 may be combined into a single display device. The gaming device 100 may further include a player tracking display 142, a credit display 120, and a bet display 122. The credit display 120 displays a player's current number of credits, cash, account balance or the equivalent. The bet display 122 displays a player's amount wagered. Locations of these displays are merely illustrative as any of these displays may be located anywhere on the gaming device 100.

The player tracking display 142 may be used to display a service window that allows the player to interact with, for example, their player loyalty account to obtain features, bonuses, comps, etc. In other embodiments, additional display screens may be provided beyond those illustrated in FIG. 2A. In some embodiments, one or more of the player tracking display 142, the credit display 120 and the bet display 122 may be displayed in one or more portions of one or more other displays that display other game related visual content. For example, one or more of the player tracking display 142, the credit display 120 and the bet display 122 may be displayed in a picture in a picture on one or more displays.

The gaming device 100 may further include a number of input devices 130 that allow a player to provide various inputs to the gaming device 100, either before, during or after a game has been played. The gaming device may further include a game play initiation button 132 and a cashout button 134. The cashout button 134 is utilized to receive a cash payment or any other suitable form of payment corresponding to a quantity of remaining credits of a credit display.

In some embodiments, one or more input devices of the gaming device 100 are one or more game play activation devices that are each used to initiate a play of a game on the gaming device 100 or a sequence of events associated with the gaming device 100 following appropriate funding of the gaming device 100. The example gaming device 100 illustrated in FIGS. 2A and 2B includes a game play activation device in the form of a game play initiation button 132. It should be appreciated that, in other embodiments, the gaming device 100 begins game play automatically upon appropriate funding rather than upon utilization of the game play activation device.

In some embodiments, one or more input device 130 of the gaming device 100 may include wagering or betting functionality. For example, a maximum wagering or betting function may be provided that, when utilized, causes a maximum wager to be placed. Another such wagering or betting function is a repeat the bet device that, when utilized, causes the previously placed wager to be placed. A further such wagering or betting function is a bet one function. A bet is placed upon utilization of the bet one function. The bet is increased by one credit each time the bet one device is utilized. Upon the utilization of the bet one function, a quantity of credits shown in a credit display (as described below) decreases by one, and a number of credits shown in a bet display (as described below) increases by one.

In some embodiments, as shown in FIG. 2B, the input device(s) 130 may include and/or interact with additional components, such as a touch-sensitive display that includes a digitizer 152 and a touchscreen controller 154 for touch input devices, as disclosed herein. The player may interact with the gaming device 100 by touching virtual buttons on one or more of the display devices 116, 118, 140. Accordingly, any of the above-described input devices, such as the input device 130, the game play initiation button 132 and/or the cashout button 134 may be provided as virtual buttons or regions on one or more of the display devices 116, 118, 140.

Referring briefly to FIG. 2B, operation of the primary display device 116, the secondary display device 118 and the player tracking display 142 may be controlled by a video controller 30 that receives video data from a processor circuit 12 or directly from a memory device 14 and displays the video data on the display screen. The credit display 120 and the bet display 122 are typically implemented as simple LCD or LED displays that display a number of credits available for wagering and a number of credits being wagered on a particular game. Accordingly, the credit display 120 and the bet display 122 may be driven directly by the processor circuit 12. In some embodiments however, the credit display 120 and/or the bet display 122 may be driven by the video controller 30. The gaming device 100 may also include a player tracking unit 24 for managing communications and functionality between the processor circuit 12 and certain peripherals and components. Player tracking units 24 may be standardized across machine types to operate interchangeably across a manufacturer's lineup.

Referring again to FIG. 2A, the display devices 116, 118, 140 may include, without limitation: a cathode ray tube, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electronemitters (SEDs), a display including a projected and/or reflected image, or any other suitable electronic device or display mechanism. In certain embodiments, as described above, the display devices 116, 118, 140 may include a touchscreen with an associated touchscreen controller 154 and digitizer 152. The display devices 116, 118, 140 may be of any suitable size, shape, and/or configuration. The display devices 116, 118, 140 may include flat or curved display surfaces.

The display devices 116, 118, 140 and video controller 30 of the gaming device 100 are generally configured to display one or more game and/or non-game images, symbols, and indicia. In certain embodiments, the display devices 116, 118, 140 of the gaming device 100 are configured to display any suitable visual representation or exhibition of the movement of objects; dynamic lighting; video images; images of people, characters, places, things, and faces of cards; and the like. In certain embodiments, the display devices 116, 118, 140 of the gaming device 100 are configured to display one or more virtual reels, one or more virtual wheels, and/or one or more virtual dice. In other embodiments, certain of the displayed images, symbols, and indicia are in mechanical form. That is, in these embodiments, the display device 116, 118, 140 includes any electromechanical device, such as one or more rotatable wheels, one or more reels, and/or one or more dice, configured to display at least one or a plurality of game or other suitable images, symbols, or indicia.

The gaming device 100 also includes various features that enable a player to deposit credits in the gaming device 100 and withdraw credits from the gaming device 100, such as in the form of a payout of winnings, credits, etc. For example, the gaming device 100 may include a bill/ticket printer 136, a bill/ticket acceptor/dispenser 128, that allows the player to deposit and/or receive tickets and/or currency into the gaming device 100.

As illustrated in FIG. 2A, the gaming device 100 may also include a currency dispenser 137 that may include a note dispenser configured to dispense paper currency and/or a coin generator configured to dispense coins or tokens in a coin payout tray.

The gaming device 100 may further include one or more speakers 150 controlled by one or more sound cards 28 (FIG. 2B). The gaming device 100 illustrated in FIG. 2A includes a pair of speakers 150. In other embodiments, additional speakers, such as surround sound speakers, may be provided within or on the housing 105. Moreover, the gaming device 100 may include built-in seating with integrated headrest speakers.

In various embodiments, the gaming device 100 may generate dynamic sounds coupled with attractive multimedia images displayed on one or more of the display devices 116, 118, 140 to provide an audio-visual representation or to otherwise display full-motion video with sound to attract players to the gaming device 100 and/or to engage the player during gameplay. In certain embodiments, the gaming device 100 may display a sequence of audio and/or visual attraction messages during idle periods to attract potential players to the gaming device 100. The videos may be customized to provide any appropriate information.

The gaming device 100 may further include a card reader 138 that is configured to read magnetic stripe cards, such as player loyalty/tracking cards, chip cards, and the like. In some embodiments, a player may insert an identification card into a card reader of the gaming device. In some embodiments, the identification card is a smart card having a programmed microchip or a magnetic strip coded with a player's identification, credit totals (or related data) and other relevant information. In other embodiments, a player may carry a portable device, such as a cell phone, a radio frequency identification tag or any other suitable wireless device, which communicates a player's identification, credit totals (or related data) and other relevant information to the gaming device. In some embodiments, money may be transferred to a gaming device through electronic funds transfer. When a player funds the gaming device, the processor circuit determines the amount of funds entered and displays the corresponding amount on the credit or other suitable display as described above.

In some embodiments, the gaming device 100 may include an electronic payout device or module configured to fund an electronically recordable identification card or smart card or a bank or other account via an electronic funds transfer to or from the gaming device 100.

FIG. 2B is a block diagram that illustrates logical and functional relationships between various components of a gaming device 100. It should also be understood that components described in FIG. 2B may also be used in other computing devices, as desired, such as mobile computing devices for example. As shown in FIG. 2B, the gaming device 100 may include a processor circuit 12 that controls operations of the gaming device 100. Although illustrated as a single processor circuit, multiple special purpose and/or general-purpose processors and/or processor cores may be provided in the gaming device 100. For example, the gaming device 100 may include one or more of a video processor, a signal processor, a sound processor and/or a communication controller that performs one or more control functions within the gaming device 100. The processor circuit 12 may be variously referred to as a "controller," "microcontroller," "microprocessor" or simply a "computer." The processor may further include one or more application-specific integrated circuits (ASICs).

Various components of the gaming device 100 are illustrated in FIG. 2B as being connected to the processor circuit 12. It will be appreciated that the components may be connected to the processor circuit 12 through a system bus 151, a communication bus and controller, such as a USB controller and USB bus, a network interface, or any other suitable type of connection.

The gaming device 100 further includes a memory device 14 that stores one or more functional modules 20. Various functional modules 20 of the gaming device 100 will be described in more detail below in connection with FIG. 2D.

The memory device 14 may store program code and instructions, executable by the processor circuit 12, to control the gaming device 100. The memory device 14 may also store other data such as image data, event data, player input data, random or pseudo-random number generators, pay-table data or information and applicable game rules that relate to the play of the gaming device. The memory device 14 may include random access memory (RAM), which can include non-volatile RAM (NVRAM), magnetic RAM (ARAM), ferroelectric RAM (FeRAM) and other forms as commonly understood in the gaming industry. In some embodiments, the memory device 14 may include read only memory (ROM). In some embodiments, the memory device 14 may include flash memory and/or EEPROM (electrically erasable programmable read only memory). Any other suitable magnetic, optical and/or semiconductor memory may operate in conjunction with the gaming device disclosed herein.

The gaming device 100 may further include a data storage 22, such as a hard disk drive or flash memory. The data storage 22 may store program data, player data, audit trail data or any other type of data. The data storage 22 may include a detachable or removable memory device, including, but not limited to, a suitable cartridge, disk, CD ROM, DVD or USB memory device.

The gaming device 100 may include a communication adapter 26 that enables the gaming device 100 to communicate with remote devices over a wired and/or wireless communication network, such as a local area network (LAN), wide area network (WAN), cellular communication network, or other data communication network. The communication adapter 26 may further include circuitry for supporting short range wireless communication protocols, such as Bluetooth and/or near field communications (NFC) that enable the gaming device 100 to communicate, for example, with a mobile communication device operated by a player.

The gaming device 100 may include one or more internal or external communication ports that enable the processor circuit 12 to communicate with and to operate with internal or external peripheral devices, such as eye tracking devices, position tracking devices, cameras, accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumb drives, ticket readers, touch screens, trackballs, touchpads, wheels, and wireless communication devices. In some embodiments, internal or external peripheral devices may communicate with the processor circuit through a universal serial bus (USB) hub (not shown) connected to the processor circuit 12.

In some embodiments, the gaming device 100 may include a sensor, such as a camera 127, in communication with the processor circuit 12 (and possibly controlled by the processor circuit 12) that is selectively positioned to acquire an image of a player actively using the gaming device 100 and/or the surrounding area of the gaming device 100. In one embodiment, the camera 127 may be configured to selectively acquire still or moving (e.g., video) images and may be configured to acquire the images in either an analog, digital or other suitable format. The display devices 116, 118, 140 may be configured to display the image acquired by the camera 127 as well as display the visible manifestation of the game in split screen or picture-in-picture fashion. For example, the camera 127 may acquire an image of the player and the processor circuit 12 may incorporate that image into the primary and/or secondary game as a game image, symbol or indicia.

Various functional modules of that may be stored in a memory device 14 of a gaming device 100 are illustrated in FIG. 2C. Referring to FIG. 2C, the gaming device 100 may include in the memory device 14 a game module 20A that includes program instructions and/or data for operating a hybrid wagering game as described herein. The gaming device 100 may further include a player tracking module 20B, an electronic funds transfer module 20C, an input device interface 20D, an audit/reporting module 20E, a communication module 20F, an operating system kernel 20G and a random number generator 20H. The player tracking module 20B keeps track of the play of a player. The electronic funds transfer module 20C communicates with a back-end server or financial institution to transfer funds to and from an account associated with the player. The input device interface 20D interacts with input devices, such as the input device 130, as described in more detail below. The communication module 20F enables the gaming device 100 to communicate with remote servers and other gaming devices using various secure communication interfaces. The operating system kernel 20G controls the overall operation of the gaming device 100, including the loading and operation of other modules. The random number generator 20H generates random or pseudorandom numbers for use in the operation of the hybrid games described herein.

Many embodiments described herein employ gaming devices 100 that are land-based EGMs, such as banks of slot machines in a casino environment, but in some embodiments, a gaming device 100 may additionally or alternatively include a personal device, such as a desktop computer, a laptop computer, a mobile device, a tablet computer or computing device, a personal digital assistant (PDA), or other portable computing devices. In some embodiments, the gaming device 100 may be operable over a wireless network, such as part of a wireless gaming system. In such embodiments, the gaming machine may be a hand-held device, a mobile device or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission.

Figure 2D:
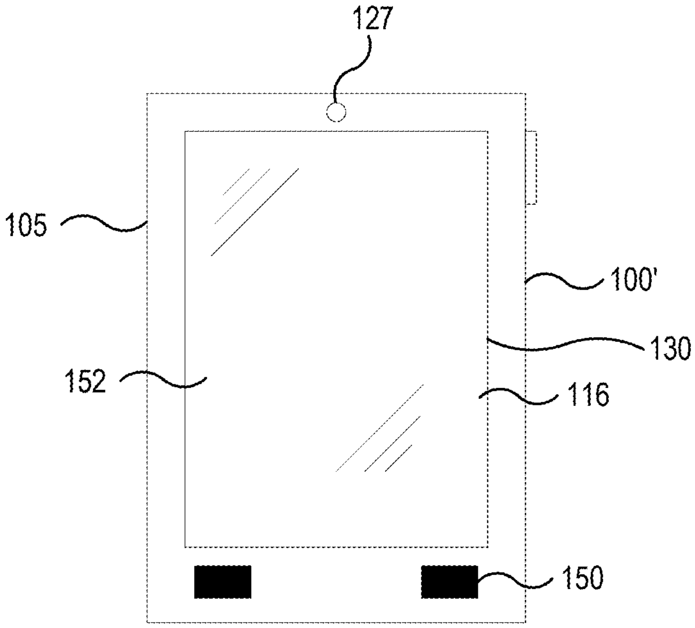

For example, referring to FIG. 2D, a gaming device 100' may be implemented as a handheld device including a compact housing 105 on which is mounted a touchscreen display device 116 including a digitizer 152. As described in greater detail with respect to FIG. 3 below, one or more input devices 130 may be included for providing functionality of for embodiments described herein. A camera 127 may be provided in a front face of the housing 105. The housing 105 may include one or more speakers 150. In the gaming device 100', various input buttons described above, such as the cashout button, gameplay activation button, etc., may be implemented as soft buttons on the touchscreen display device 116 and/or input device 130. In this embodiment, the input device 130 is integrated into the touchscreen display device 116, but it should be understood that the input device may also, or alternatively, be separate from the display device 116. Moreover, the gaming device 100' may omit certain features, such as a bill acceptor, a ticket generator, a coin acceptor or dispenser, a card reader, secondary displays, a bet display, a credit display, etc. Credits can be deposited in or transferred from the gaming device 100' electronically.

Figure 2E:
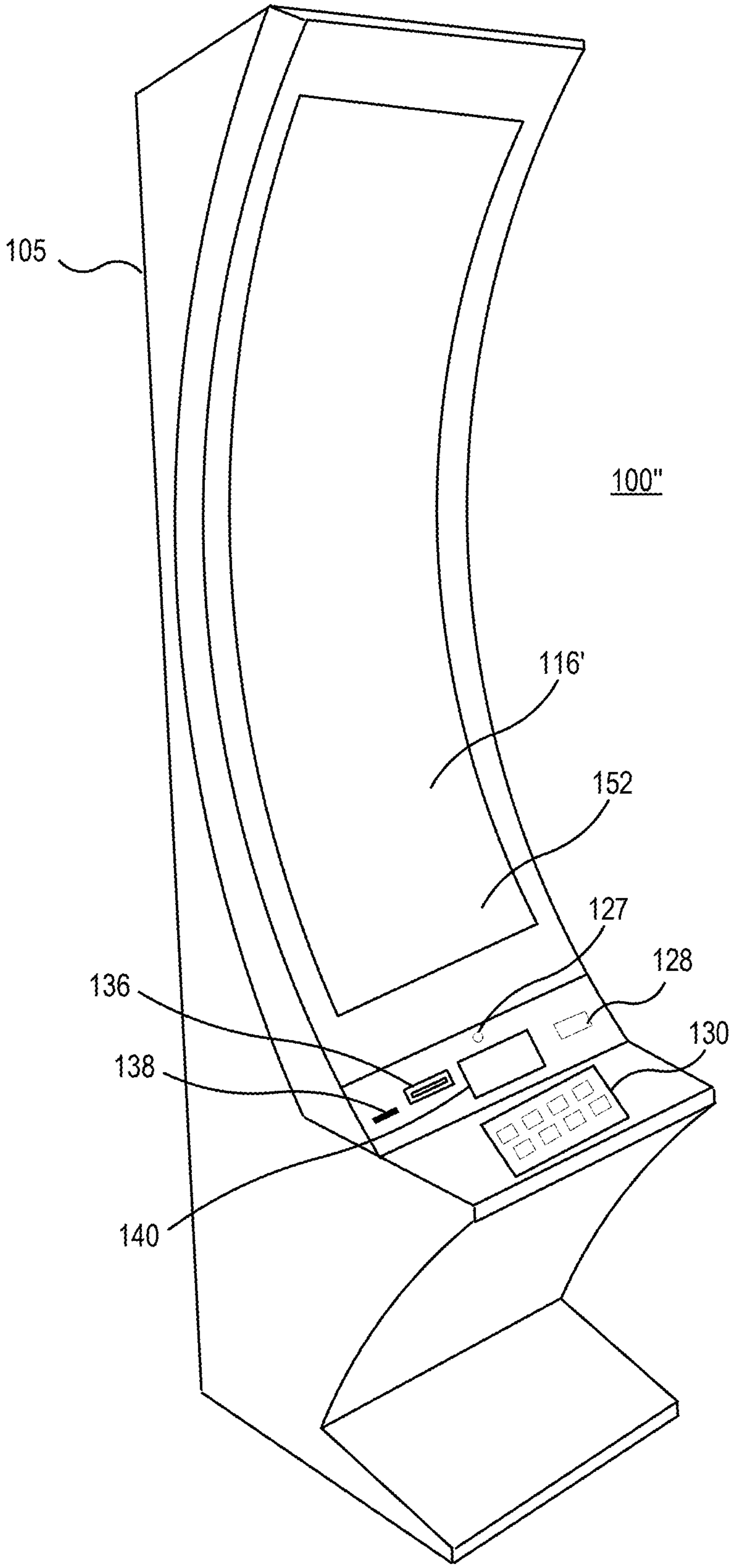

FIG. 2E illustrates a standalone gaming device 100", i.e., an EGM in this example, having a different form factor from the gaming device 100 illustrated in FIG. 2A. In particular, the gaming device 100" is characterized by having a large, high aspect ratio, curved primary display device 116' provided in the housing 105, with no secondary display device. The primary display device 116' may include a digitizer 152 to allow touchscreen interaction with the primary display device 116'. The gaming device 100" may further include a player tracking display 142, an input device 130, a bill/ticket acceptor 128, a card reader 138, and a bill/ticket dispenser 136. The gaming device 100" may further include one or more cameras 127 to enable facial recognition and/or motion tracking.

Although illustrated as certain gaming devices, such as electronic gaming machines (EGMs) and mobile devices, similar functions and/or operations as described herein may include wagering stations that may include electronic game tables, conventional game tables including those involving cards, dice and/or roulette, and/or other wagering stations such as sports book stations, video poker games, skill-based games, virtual casino-style table games, or other casino or non-casino style games. Further, gaming devices according to embodiments herein may be implemented using other computing devices and mobile devices, such as smart phones, tablets, and/or personal computers, among others.

Figure 3:
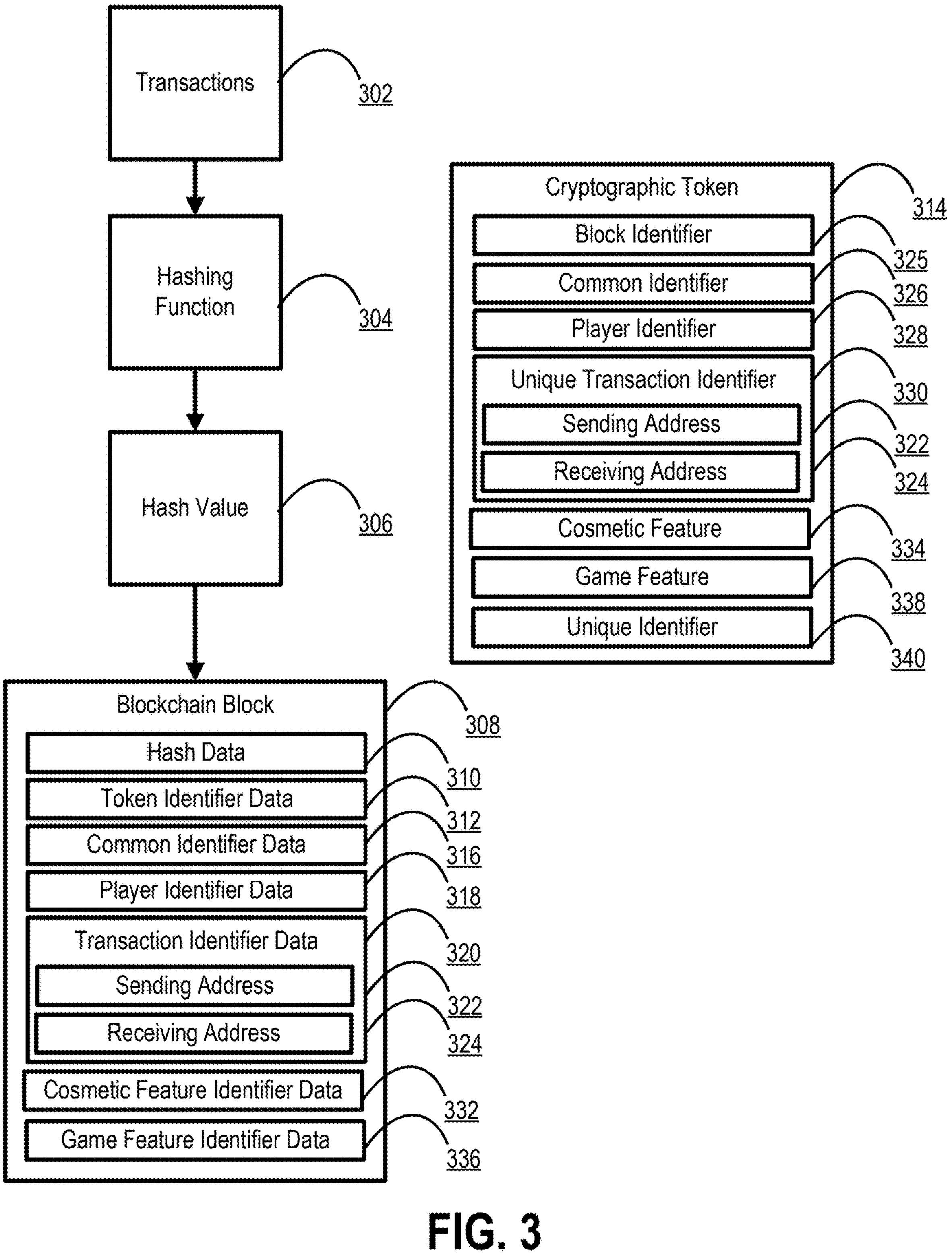
FIG. 3 is a schematic block diagram illustrating various operations for a blockchain token transaction according to some embodiments.

Referring now to FIG. 3, a schematic block diagram illustrates various operations for a blockchain transaction recordation according to some embodiments. As illustrated in FIG. 3, transactions 302 may occur at various blockchain nodes. In accordance with various embodiments, a hash may be created for each entry. For example, a cryptographic hash function may create a one-way, (essentially) collision free signature of the entry. The hash algorithm generates a hash. Using hashing function 304, hash values 306 of these transactions are created and added to blockchain blocks 308 that are in the blockchain data structure.

In this example, each blockchain block 308 may include one or more different types of data. For example, each blockchain block 308 may include cryptographic hash data 310 indicative of a result of the hashing function 304 associated with a common blockchain, token identifier data 312 indicative of an identity of a cryptographic token 314 associated with the block 308, common identifier data 316 indicative of the cryptographic token 314 being part of a plurality of cryptographic tokens, e.g., a defined subset of tokens based on different criteria, associated with the common blockchain, player identifier data 318 indicative of an identity of a player associated with the cryptographic token 314, transaction identifier data 320 associated with the unique transaction on the blockchain, which may include a sending address 322 associated with a provider of the cryptographic token 314 and a receiving address 324 associated with the player identifier data 318.

The cryptographic token 314 may include some or all of the data structure of the respective associated block 308 and/or may contain a block identifier 325 referring to the associated block 308, which allows the cryptographic token 314 to be securely and transparently authenticated against the blockchain. In some examples, the cryptographic token 314 may include a common identifier 326 corresponding to the common identifier data 316 and indicative of the cryptographic token 314 being part of the plurality of cryptographic tokens, and a player identifier 328 corresponding to the player identifier data 318 and indicative of a player associated with the cryptographic token 314. The cryptographic token 314 may include a unique transaction identifier 330 associated with a unique transaction on the blockchain, i.e., a unique block 308, and may include the sending address 322 and/or the receiving address 324.

For example, a new transaction for the cryptographic token may include transmitting a transaction indication of the new transaction including a sending address 322 and receiving address 324, and, based on the transaction indication, modifying the player identifier data 318 in a new block 308 and/or the player identifier 328 of the cryptographic token 314 to be indicative of a different player.

In some examples, each block 308 may further include cosmetic feature identifier data 332 associated with a cosmetic feature 334, such as a stored graphical image and/or a graphical modification of a game element of a wagering game. Each block 308 may further include game feature identifier data 336 associated with a game feature 338 for redeeming a portion of a non-monetary credit amount as a monetary award amount. Each cryptographic token 314 may be a fungible token that is fungible with other cryptographic tokens, and/or may further include a unique identifier 340, which may correspond to the token identifier data 312 of the block 308, such that the cryptographic token 314 is a non-fungible token that is not fungible with other cryptographic tokens.

As a general principle, a validation process may be performed to ensure that each new blockchain block 308 meets the criteria for inclusion into the blockchain data structure. In a blockchain configuration, there are varying consensus algorithms that can be used. For example, a private blockchain may choose an algorithm such as Practical Byzantine Fault Tolerance (PBFT). The PBFT mechanism may be useful for small networks, such as networks having fewer than about 100 nodes. Other examples include a Proof of Work (PoW) consensus algorithm and/or a Proof of Stake (PoS) consensus algorithm, which may be used as the value of an underlying data block and/or value changes.

In some embodiments, a gaming system generates and provides a cryptographic token to a player. In some examples, the cryptographic token is a non-fungible token created in a blockchain. For example, following a random determination of a designated outcome during a play of a game on an electronic gaming machine (i.e., the occurrence of the non-fungible token creation event), the system operates with a decentralized, open-source blockchain to cause the creation of a non-fungible token associated with digital content related to the randomly determined designated outcome, such as digital content of an image of the randomly determined designated outcome.

More specifically, in various embodiments, as part of an event occurring in association with a gaming establishment (e.g., as part of one or more awards provided to a player in association with one or more games played at an electronic gaming machine, as part of one or more payouts provided to a player in association with one more winning sporting event wagers placed, and/or as part of a player realizing an achievement separate from any play of any game), the system of the present disclosure causes the creation, written in a block on a blockchain, of a non-fungible token. Such a non-fungible token is a unique cryptographic entry that does not have a one-to-one value with other non-fungible tokens and is not interchangeable with other non-fungible tokens. Such a non-fungible token additionally functions as a mechanism for the player to memorialize the event associated with the gaming establishment. That is, the created non-fungible token provides a digital representation of one or more events occurring in association with a gaming establishment wherein ownership of the digital representation may be verified via suitable blockchain technology. Such a configuration thus enables certain players to accumulate non-fungible tokens as a collectable asset commemorating the player's gaming experience.

While certain embodiments described below are directed to creating a unique non-fungible token owned by a player in association with one or more plays of a primary game, such as a primary wagering game, it should be appreciated that such embodiments may additionally or alternatively be employed in association with creating a unique non-fungible token owned by a player in association with one or more plays of a secondary game, such as a bonus game or a communal game. It should be further appreciated that the disclosed system utilized to cause a creation and distribution of non-fungible tokens may be any suitable personal gaming device, such as a mobile device executing an application, any suitable electronic gaming machine ("EGM") (such as a slot machine, a video poker machine, a video lottery terminal, a terminal associated with an electronic table game, a sporting event wagering terminal, a video keno machine, or a video bingo machine) which enables a player to play one or more games of chances, one or more games of skill (or partial skill), and/or place one or more sporting event wagers, any suitable slot machine interface board which is in communication with an EGM which enables a player to play one or more games of chances, one or more games of skill (or partial skill), and/or place one or more sporting event wagers, and/or any suitable combination of a server operating with a personal gaming device, an EGM, and/or a slot machine interface board associated with an EGM which enables a player to play one or more games of chances, one or more games of skill (or partial skill), and/or place one or more sporting event wagers.

Various embodiments herein describe a cryptographic token that can enable a player to play a wagering game with a style that is different than a default style. In some embodiments, the wagering game includes a slot game, table game, or sports book provided by an EGM. In additional or alternative embodiments, the EGM provides the wagering game to a player using a visual style, audible style, or a playstyle that is different than a default style based on the cryptographic token being owned by the player.

In some embodiments, a cryptographic token can include an indication of a style of outputting a game feature (e.g., a modification of a default game feature). In additional or alternative embodiments, the cryptographic token can include information (e.g., win history) associated with a deck of cards. In additional or alternative embodiments, the style of outputting the game feature can be modified based on the information. For example, if a deck of cards has a win percentage or win total above a threshold value, a special style of outputting the game feature may be used.

Embodiments associated with cryptographic token-based game features being used in a poker game are described below. However, similar embodiments can apply to other types of wagering games.

In some embodiments, the wagering game is a poker game and the traditional face cards in a player's hand are displayed to the player using a set of virtual symbols based on the player owning a cryptographic token. In some examples, the cryptographic token is associated with a band and the face cards are replaced with cards corresponding to each member of the band.

In additional or alternative embodiments, a poker player can have their own NFT-based digital poker cards with which they can play poker in various forms (e.g., online poker, electronic table game poker, traditional table poker with gameplay video tracking, video poker, or metaverse-like poker). In some examples, the NFT poker cards can have different designs, sounds, animations, or valances. In additional or alternative examples, the NFT poker cards can be a set of cards (e.g., a thematic set of 52 cards) or a single card.

In additional or alternative embodiments, players can buy or earn cards. In some examples, a player can win a card by playing (or winning) a game. In additional or alternative examples, the player can be randomly selected to receive the NFT card.

In additional or alternative embodiments, the NFT cards are stored on a blockchain and/or linked to a player's digital wallet. In some examples, the NFT cards can be activated by a gaming system authenticating them within a game (e.g., by having a player log in to their player account, detecting use of a player tracking card, or by a player linking their digital wallet to the game such as via mobile device connection).

In additional or alternative embodiments, a player's NFT poker cards may be present for an entire game or during specific game events.

In some embodiments, as a cosmetic prestige-creating mechanism, upon execution, the NFT cards (their effects, their appearance, etc.) of one player are visible to all players.

In additional or alternative embodiments, as a rewarding mechanism, NFT-based bonus features are enabled so that, in addition to the regular poker game play, additional side-games can run, which are either single player (every player for themselves) or multi player side-games (the player who gains an achievement first, wins it).

In online poker, players can log into their crypto wallet on their device and play from there. Each player can activate their NFT cards, and their appearance can be distributed to all other players'devices during the play instance.

In electronic table poker, players can log in at the table game and NFT cards can be activated from there.

For a traditional poker table with actual cards, an overhead projector can be synced with the game (e.g., through camera tracking of the cards), and can project NFT card's effects/animations etc. onto the table's surface on top of the regular cards. So, for example, the winning player's best 5 cards could be "augmented" through the projection. Also through camera tracking, on a screen next to the table, the game itself, game history, or leaderboards can be shown where the "hot player's" NFT card effects are presented.

On video poker EGMs, NFT poker cards can be activated by the player same as with an electronic poker table. However, in a single player game, only NFT cards from the one player are activated, shown, and played with.

A metaverse-like poker game may be similar to online poker, however, with the potential for more 3D-like NFT poker card effects as part of the virtual environment.

Once NFT poker cards are exhausted, a series is completed, or a player simply wants to get rid of their NFT poker cards, they can sell them on the crypto market. Either they sell single cards, series of cards, or whole collected card decks. More valuable, rare, or complete cards/card decks would be traded for higher cash amounts, as they are scarcer. As part of the NFT cards, a smart contract can be stored within them, so that with every trade made on the crypto market, either the operator and/or the manufacturer receives a certain percentage of the trade value.

In some embodiments, when revealing a player's poker hand (e.g., during showdown), a player's cards are displayed to everyone based on the cryptographic token associated with the player. In additional or alternative embodiments, when winning big with a poker hand, a player's cryptographic token associated with poker cards in the poker hand are shown on a stats board with additional owner-information, and also with its value.

In additional or alternative embodiments, when playing video poker, a player can customize the card decks completely and substitute each card with a cryptographic token-based card. In some examples, the cryptographic token can include an indication of a complete card set and a video poker display can replace them in the game. In additional or alternative examples, the cryptographic token can include an indication of a single card, card color (e.g., Hearts only), card type (e.g., Kings only), that the game can be customized with.

In additional or alternative embodiments, at an electronic multi-player poker table, the "Table Leader's" NFT card deck can be played with by all players (e.g., everyone plays with the leader's card deck).

In additional or alternative embodiments, a game feature of the game can include a starting jingle/animation when a card is played and a cryptographic token can indicate a specific jingle/animation to be used.

In additional or alternative embodiments, a game feature of the game can include an animation or sound during a win and a cryptographic token can indicate a specific animation or sound to be used when the owner of the cryptographic token wins.

In additional or alternative embodiments, on an electronic poker table, not only cards can be associated with cryptographic tokens, but also the poker player's picture, frames, avatar, and avatar's clothes. In some examples, a player who has no avatar NFT is shown with a default "player icon". Whereas, everyone who owns an NFT avatar, is represented by the avatar, instead.

In additional or alternative embodiments, a cryptographic token can enable side-betting on specific wagering events. In some examples, a specific wagering events includes a standard poker event such as a Flush. In additional or alternative examples, the specific wagering event includes an NFT-card-based event, such as "3 of a kind with an NFT card." In additional or alternative examples, the specific wagering event includes a "Side-wager to earn NFTs": That could be used to gain the chance to win further NFTs while the regular poker game is being played.

In additional or alternative embodiments, using a cryptographic token can enable additional chances to win a wagering game or a side game.

In additional or alternative embodiments, using a cryptographic token can increase the odds for a mystery card to be dealt or won. In some examples, mystery cards can be collected and traded (color of poker card is hidden), however, once it is revealed by the player the card is bound to the player's account and not tradeable anymore. In additional or alternative examples, the player on the table who won the most with NFT-based cards gets a new mystery card. In additional or alternative embodiments, the player on the table that meets a play threshold with NFT-based cards: "Every player wo played 1,000 hands with their NFT poker cards gets a mystery card."

In additional or alternative embodiments, a system can provide an event to "Complete your set" (side-game with NFT-based poker cards). In some examples, the system can provide limited bonus activations for "get a chance to complete your set with 1 missing NFT card to gain extra reward". Could be that a side game option pops up during the regular play "you can activate your NFT poker card now to complete the series, and participate in the side game"

In additional or alternative embodiments, a system includes collecting additional loyalty points the more NFT cards owned by a player. For example, a winning hand with $1 of regular cards rewards with 10 loyalty points, whereas with a winning NFT hand, it rewards with 20 loyalty points.

In additional or alternative embodiments, a NFT poker card deck collects "progress points." For example, the more often a player plays with the deck/the more wins the player made with this NFT deck, the more level-up-points are collected. At one point, card deck "levels up" to a Level 2 card deck.

In additional or alternative embodiments, a cryptographic token can be associated with a themed set of poker cards such that players aim to collect a full set to activate perks/additional features.

In additional or alternative embodiments, poker cards can be enhanced with additional features/functionalities that would allow playing a side-game. In some examples, additional attributes are added to each poker-card. In some examples, the side-game includes a pet fighting game and each of the poker cards have attributes such as stamina, attack, defense. When cards are played out, the player's pet starts an action according to the card's attribute.

In additional or alternative embodiments, the NFT indicates a paytable or pay categories available to play with.

Figure 4:
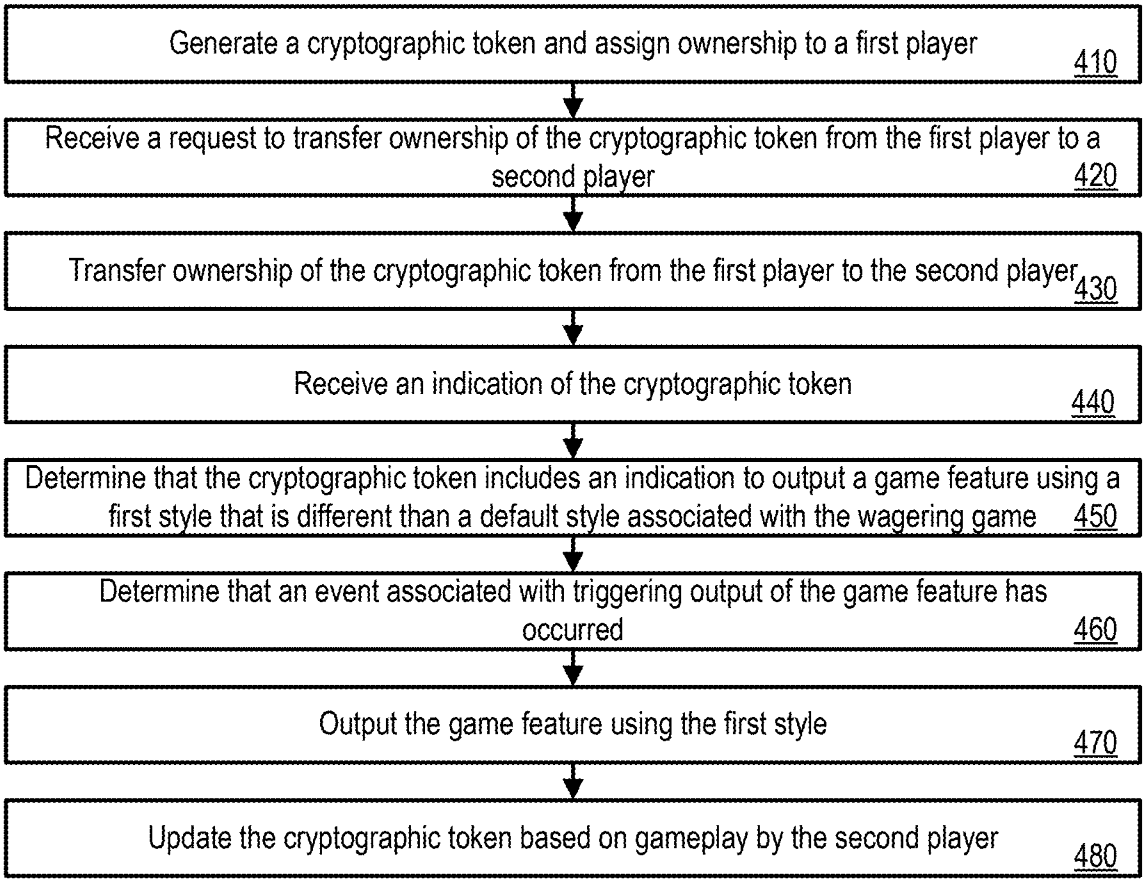
FIGS. 4-5 are flow charts illustrating examples of operations performed by a system according to some embodiments.

FIG. 4 illustrates examples of operations performed by a system according to some embodiments. Although the operations will be described in regards to processing circuit 42 of a central controller 40, the operations can be performed by any suitable system and/or any device within a system (e.g., processing circuit 12 of EGM 100).

At block 410, processing circuit 42 generates a cryptographic token and assigns ownership to a first player. In some embodiments, the cryptographic token is generated based on gameplay by the first player. In additional or alternative embodiments, the cryptographic token is generated and provided to the first player as part of a promotional event offered by a casino operator.

At block 420, processing circuit 42 receives, via network interface 46, a request to transfer ownership of the cryptographic token from the first player to a second player. In some embodiments, the request to transfer ownership of the cryptographic token is received in response to the results of a wagering game. In additional or alternative embodiments, the request to transfer ownership of the cryptographic token is received from a device associated with the first player.

At block 430, processing circuit 42 transfers ownership of the cryptographic token from the first player to the second player. In some embodiments, transferring ownership of the cryptographic token includes modifying a blockchain associated with the cryptographic token.

At block 440, processing circuit 42 receives an indication of the cryptographic token. In some embodiments, the system receives the indication of the cryptographic token from an EGM. In additional or alternative embodiments, the system receives an indication of the player and retrieves the indication of the cryptographic token from a database based on the indication of the player.

At block 450, processing circuit 42 determines that the cryptographic token includes an indication to output a game feature using a first style that is different than a default style associated with the wagering game. In some embodiments, the first style is a first style of gameplay and the default style is a second style of gameplay. In some examples, the first style of gameplay includes a first set of rules and the second style of gameplay includes a second set of rules that is different than the first set of rules. In additional or alternative examples, the first style of gameplay includes a first paytable and the second style of gameplay includes a second paytable that is different than the first paytable. In additional or alternative examples, the first style of gameplay includes wagering an amount of money and the second style of gameplay includes wagering the cryptographic token.

At block 460, processing circuit 42 determines that an event associated with triggering output of the game feature has occurred.

At block 470, processing circuit 42 outputs the game feature using the first style. In some examples, the game feature is part of a multiplayer game (e.g., a poker game). In some embodiments, outputting the game feature as part of the wagering game includes displaying the game feature using the first style via a first device associated with the second player and outputting the game feature using a second style via a second device associated with another player. In additional or alternative embodiments, outputting the game feature as part of the wagering game includes outputting the game feature using the first style to each of the multiple players.

In additional or alternative embodiments, outputting the game feature includes displaying a virtual game element using a visual characteristic associated with the cryptographic token. In some examples, the wagering game includes a card game. The virtual game element can include a virtual card in a hand associated with a first player. Displaying the virtual game element can include displaying the virtual card using the visual characteristic. In additional or alternative examples, the virtual game element includes a virtual representation of a poker card and the visual characteristic includes replacement of a traditional symbol (e.g., an ace) with a special symbol (e.g., a Formula One driver) associated with an event (e.g., a Formula One race).

In additional or alternative embodiments, the game feature is an audible game feature. Outputting the game feature as part of the wagering game includes outputting the audible game feature.

In additional or alternative embodiments, the game feature is a prize. A type of the prize can be based on the cryptographic token. The event associated with triggering output of the game feature can be based on the cryptographic token. Outputting the game feature as part of the wagering game includes providing the prize via a procedure based on the cryptographic token.

At block 480, processing circuit 42 updates the cryptographic token based on gameplay by the second player. In some embodiments, updating the cryptographic token based on the gameplay by the player includes updating the cryptographic token based on the game feature being output using the first style.

Various operations from the flow chart of FIG. 4 may be optional with respect to some embodiments systems and related methods.

Embodiments associated with incorporating cryptographic token-based game features with physical playing cards (e.g., real-world poker cards) are further described below. Some embodiments herein bridge the gap between physical card play and digital NFTs owned by a player.

In some embodiments, a physical playing card has an identifier embedded within or on the playing card itself. In some examples, the identifier includes a near field communication ("NFC") tag or another electronic tag. In additional or alternative examples, the identifier includes a quick-response ("QR") code or other visual code.

In additional or alternative embodiments, regular/traditional playing cards are used and a gaming system tracks the cards that are in play. In some examples, a camera-tracking or image recognition system tracks the physical playing cards being used.

In additional or alternative embodiments, a gaming system associated with the wagering game scans the cards and keeps track of which player each card belongs to within a gaming round (e.g., a hand). The gaming system can retrieve information associated with a cryptographic token owned by one of the players and augment a virtual appearance of a card or the gaming round based on that player's ownership of the cryptographic token.

In some examples, a physical poker card has an NFC tag with a unique code embedded to allow the owner to mint the encoded NFT and add it to the owner's virtual wallet. The collected card/NFT may be a virtual copy of the physical poker card. Whenever the NFT-enhanced poker card is physically played, sensor in the poker table (e.g., a NFC reader) detects and activates the digital NFT feature if the player is eligible in the current situation. In additional or alternative examples, the feature includes collecting additional player loyalty bonus points.

In additional or alternative examples, a physical poker card has a low-energy display embedded therein that displays NFT related information. The card can dynamically update NFT related information depending on game-state, owner, and card activation. Player can trade NFTs and thereby update the added features of their poker cards. Players can dynamically assign and change owned NFT enhancements to their poker cards.

In additional or alternative examples, if a specific NFT enhanced card is played a side-game (e.g., a double-up feature) is offered to the player.

In additional or alternative embodiments, the playing cards can be made out of e-paper. NFT functionality can be published on the card's e-paper wirelessly. In some examples, the playing card can include an e-paper card face where the card stores a static image. In additional or alternative examples, a card dispenser would do the writing of the cards to the screen. The electronics would be in the dispenser and the cards themselves would only be the e-paper display without the card.

In additional or alternative embodiments, the system includes a projector that augments game features by projecting images on top of (or adjacent to) the physical cards.

In additional or alternative embodiments, the system includes a playing table with a camera window such that when a playing card is placed face down on the camera window a camera looks up and sees the card. In some examples, each player has their own camera window and its corresponding camera detects the identity of the physical playing card and associates with the correct player. The system could then apply player NFT poker card functionality to the game based upon the NFTs that are the player has registered and the physical playing cards in the player's hand.

In additional or alternative embodiments, a player provides an indication of their identity or their owned cryptographic tokens to the system, which links this information to a specific seat at a playing table. In some examples, the playing cards have thermal paper embedded on the face of the cards which allows a thermal printer to print to the card just before the dealer moves the card to the player. A card reader built into the shuffle system would know which card is being passed out and depending on if the player has an NFT of that card it would be written to.

In additional or alternative embodiments, the cryptographic token-based game features can be determined and displayed on a video feed (e.g., TV or online streaming) of the game.

In additional or alternative embodiments, a single physical card can include one or more indicators that are each associated with one or more NFTs. In additional or alternative embodiments, when the physical card is placed on to a gaming table, an integrated sensor can determine the indicator (e.g., read a code via a NFC tag). The code can be associated with a NFT, which can be minted and moved to a player's (e.g., the card owners) virtual wallet. In some examples, a gaming system may provide a confirmation to the player that the NFT was received successfully (e.g., via a display).

In additional or alternative embodiments, the player may be able to activate/deactivate/adjust the game feature associated with the NFT. In some examples, the player may activate/deactivate/adjust game features associated with the NFT via a touchable display. In additional or alternative examples, the game features may only be adjusted between games.

Figure 5:
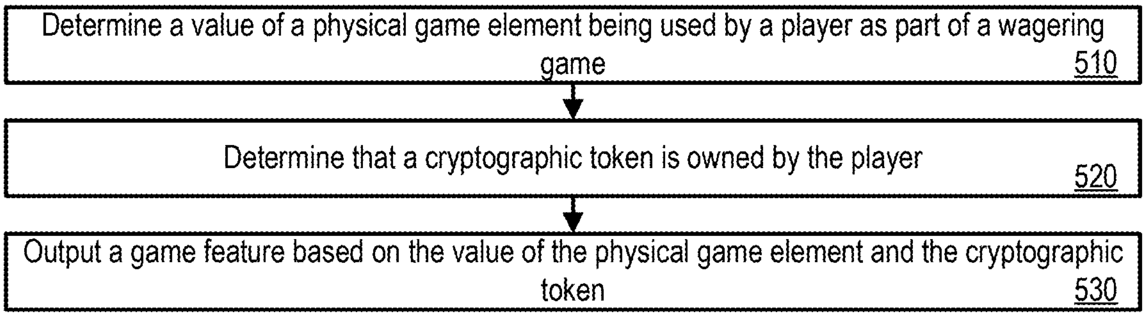

FIG. 5 illustrates examples of operations performed by a system according to some embodiments. Although the operations will be described in regards to processing circuit 42 of a central controller 40, the operations can be performed by any suitable system and/or any device within a system (e.g., processing circuit 12 of EGM 100).

At block 510, processing circuit 12 determines a value of a physical game element being used by a player as part of a wagering game. In some embodiments, the physical game element is a physical playing card. Determining the value of the physical game element being used by the player as part of the wagering game comprises determining an identity of the physical playing card being used by the player.

In some examples, the system includes an image capture device. Determining the identity of the physical playing card comprises determining, by the image capture device, the identity of the physical playing card.

In additional or alternative examples, the system includes a near-field communication ("NFC") reader. Determining the identity of the physical playing card comprises detecting, by the NFC reader, a NFC tag attached to the physical playing card; and determining the identity of the physical playing card based on the NFC tag.

In additional or alternative examples, the system includes a printer. Determining that the cryptographic token is owned by the player comprises determining that the cryptographic token is owned by the player prior to the physical playing card being dealt to the player. In some embodiments, the operations further include printing, by the printer, an indication of the cryptographic token on the physical playing card.

At block 520, processing circuit 12 determines that a cryptographic token is owned by the player. In some embodiments, determining that the cryptographic token is owned by the player comprises: determining an identity of the player; and obtaining an indication of the cryptographic token from a virtual wallet associated with the player using the identity of the player.

In additional or alternative embodiments, determining that the cryptographic token is owned by the player comprises receiving an indication of the cryptographic token from the player.

At block 530, processing circuit 12 outputs a game feature based on the value of the physical game element and the cryptographic token. In some embodiments, outputting the game feature comprises crediting an account associated with the player based on the cryptographic token.

In additional or alternative examples, the system includes a sensor configured to detect a position of the physical playing card after the physical playing card is dealt based on detecting the indication of the cryptographic token on the physical playing card. In additional or alternative embodiments, the operations further include determining, by the sensor, the position of the physical playing card. Outputting the game feature comprises outputting the game feature based on the position of the physical playing card.

In additional or alternative examples, the system includes a transmitter configured to transmit an indication of an image to a playing card. Determining the value of the playing card comprises determining the value to be given to the playing card. Outputting the game element comprises transmitting, via the transmitter, an indication of an image comprising the value and the game element to the playing card.

In additional or alternative examples, the system includes a projector configured to project a virtual game feature onto a playing area associated with the wagering game. Outputting the game feature comprises displaying, via the projector, a virtual game feature onto the playing area associated with the wagering game based on a value of the physical game element and using a visual style based on the cryptographic token.

In additional or alternative examples, the system includes a play surface associated with the wagering game that comprises a display device. Outputting the game feature comprises displaying, via the display device, a virtual game feature based on the value of the physical game element and using a visual style based on the cryptographic token.

In additional or alternative examples, the system includes a speaker configured to output an audible game feature associated with the wagering game. Outputting the game feature comprises outputting, via the speaker, an audible game feature based on the value of the physical game element and the cryptographic token.

In additional or alternative examples, the system includes a transceiver configured to communicate information associated with the wagering game with an augmented reality ("AR") device associated with the player. Outputting the game feature comprises transmitting, via the transceiver, an indication of the game feature to the AR device.

In additional or alternative examples, the system includes an augmented reality ("AR") device configured to display a virtual portion of the wagering game to the player. Outputting the game feature comprises displaying, via the AR device, a virtual game feature based on the value of the physical game element and the cryptographic token.

Various operations from the flow chart of FIG. 5 may be optional with respect to some embodiments systems and related methods.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks. The flowchart and block diagrams in the FIGS. illustrate the architecture, functionality, and operation of possible implementations of systems, methods, and computer program products according to various aspects of the present disclosure. In this regard, each block in the flowchart or block diagrams may represent a module, segment, or portion of code, which includes one or more executable instructions for implementing the specified logical function(s). It should also be noted that, in some implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be designated as "/". Like reference numbers signify like elements throughout the description of the figures.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

What is claimed is:

1. A system comprising:

processing circuitry;

a poker table;

a projector configured to project a virtual game feature onto the poker table;

a near-field communication ("NFC") reader; and memory coupled to processing circuitry and having instructions stored therein that are executable by the processing circuitry to cause the system to perform operations comprising:

determining a value of a physical poker card being used by a player as part of a poker game at the poker table;

detecting, via the NFC reader, a cryptographic token, wherein the cryptographic token comprises a collision-free signature of entry created using a hashing function associated with a common blockchain and transaction data comprising sending addresses and receiving addresses for a plurality of unique transactions;

determining that the cryptographic token is owned by the player based on the transaction data of the cryptographic token;

securely authenticate the cryptographic token against the common blockchain based on the collision-free signature of entry of the cryptographic token; and outputting a game feature based on the value of the physical poker card and the cryptographic token, wherein outputting the game feature comprises displaying, via the projector, the virtual game feature onto the poker table using a visual style based on the cryptographic token, wherein the virtual game feature comprises an animation projected onto the poker table.

2. The system of claim 1, wherein determining the value of the physical poker card being used by the player as part of the poker game comprises determining an identity of the physical poker card being used by the player.

3. The system of claim 2, further comprising:

an image capture device, wherein determining the identity of the physical poker card comprises determining, by the image capture device, the identity of the physical poker card.

4. The system of claim 2, further comprising:

wherein determining the identity of the physical poker card comprises:

detecting, by the NFC reader, a NFC tag attached to the physical poker card; and determining the identity of the physical poker card based on the NFC tag.

5. The system of claim 2, further comprising:

a printer, wherein determining that the cryptographic token is owned by the player comprises determining that the cryptographic token is owned by the player prior to the physical playing poker card being dealt to the player, the operations further comprising:

printing, by the printer, an indication of the cryptographic token on the physical poker card.

6. The system of claim 5, further comprising:

a sensor configured to detect a position of the physical poker card after the physical poker card is dealt based on detecting the indication of the cryptographic token on the physical playing poker card, the operation further comprising:

determining, by the sensor, the position of the physical poker card, wherein outputting the game feature comprises outputting the game feature based on the position of the physical poker card.

7. The system of claim 2, further comprising:

a transmitter configured to transmit an indication of an image to the physical poker card, wherein determining the value of the physical poker card comprises determining the value to be given to the physical poker card, and wherein outputting the game element comprises transmitting, via the transmitter, an indication of an image comprising the value and the game element to the physical poker card.

8. The system of claim 1, wherein outputting the game feature comprises crediting an account associated with the player based on the cryptographic token.

9. The system of claim 1, wherein determining that the cryptographic token is owned by the player comprises:

determining an identity of the player; and obtaining an indication of the cryptographic token from a virtual wallet associated with the player using the identity of the player.

10. The system of claim 1, wherein determining that the cryptographic token is owned by the player comprises receiving an indication of the cryptographic token from the player.

11. The system of claim 1, further comprising:

a play surface associated with the poker game that comprises a display device, wherein outputting the game feature comprises displaying, via the display device, a virtual game feature based on the value of the physical poker card and using a visual style based on the cryptographic token.

12. The system of claim 1, further comprising:

a speaker configured to output an audible game feature associated with the poker game, wherein outputting the game feature comprises outputting, via the speaker, an audible game feature based on the value of the physical poker card and the cryptographic token.

13. The system of claim 1, further comprising:

a transceiver configured to communicate information associated with the poker game with an augmented reality ("AR") device associated with the player, wherein outputting the game feature comprises transmitting, via the transceiver, an indication of the game feature to the AR device.

14. The system of claim 1, further comprising:

an augmented reality ("AR") device configured to display a virtual portion of the poker game to the player, wherein outputting the game feature comprises displaying, via the AR device, a virtual game feature based on the value of the physical poker card and the cryptographic token.

15. An electronic poker table comprising:

processing circuitry;

a table;

a projector configured to project a virtual game feature onto the table;

a near-field communication ("NFC") reader; and memory coupled to processing circuitry and having instructions stored therein that are executable by the processing circuitry to cause the EGM to perform operations comprising:

receiving an indication of a value of a physical poker card being used by a player as part of a poker game provided by the electronic poker table;

detecting, via the NFC reader, a cryptographic token, wherein the cryptographic token comprises a collision-free signature of entry created using a hashing function associated with a common blockchain and transaction data comprising sending addresses and receiving addresses for a plurality of unique transactions;

determining that the cryptographic token is owned by the player based on the transaction data of the cryptographic token;

securely authenticate the cryptographic token against the common blockchain based on the collision-free signature of entry of the cryptographic token; and outputting a virtual game element associated with the poker game based on the value of the physical poker card and using a style based on a cryptographic token owned by the player, wherein outputting the game feature comprises displaying, via the projector, the virtual game feature onto the table using a visual style based on the cryptographic token, wherein the virtual game feature comprises an animation projected onto the table.

16. The electronic poker table of claim 15, wherein outputting the virtual game element associated with the poker game comprises:

determining that the player has a winning poker hand;

determining to display a virtual indicator that the player has the winning poker hand; and determining to use a specific virtual graphic as the virtual indicator based on the cryptographic token being owned by the player; and outputting the specific virtual graphic.

17. The electronic poker table of claim 15, the operations further comprising:

receiving an indication that the cryptographic token is owned by the player.

18. The EGM electronic poker table of claim 15, the operations further comprising:

updating the cryptographic token based on the poker game being played.

19. A method comprising:

determining a value of a physical poker card being used by a player as part of a poker game at a poker table;

detecting, via a near-field communication ("NFC") reader, a cryptographic token, wherein the cryptographic token comprises a collision-free signature of entry created using a hashing function associated with a common blockchain and transaction data comprising sending addresses and receiving addresses for a plurality of unique transactions;

determining that the cryptographic token is owned by the player based on the transaction data of the cryptographic token;

securely authenticate the cryptographic token against the common blockchain based on the collision-free signature of entry of the cryptographic token; and outputting a game feature associated with the poker game based on the value of the physical poker card and the cryptographic token, wherein outputting the game feature comprises displaying, via a projector, the virtual game feature onto the poker table using a visual style based on the cryptographic token, wherein the virtual game feature comprises an animation projected onto the poker table.

20. The method of claim 19, wherein determining the value of the physical poker card being used by the player as part of the poker game comprises determining an identity of the physical poker card being used by the player.

* * * * *